(12) United States Patent
Kim et al.

(10) Patent No.: US 9,667,111 B2
(45) Date of Patent: May 30, 2017

(54) ROTOR OF ELECTRIC MOTOR AND MOTOR USING THE SAME

(71) Applicants: SAMSUNG ELECTRONICS CO., LTD., Suwon-si (KR); Kyungpook National University Industry-Academic Cooperation Foundation, Daegu (KR)

(72) Inventors: Won-ho Kim, Hwaseong-si (KR); Seong-taek Lim, Suwon-si (KR); Hong-soon Choi, Daegu (KR); Jin-woo Cho, Seongnam-si (KR)

(73) Assignees: SAMSUNG ELECTRONICS CO., LTD., Suwon-si (KR); Kyungpook National University Industry-Academic Cooperation Foundation, Daegu (KR)

( * ) Notice: Subject to any disclaimer, the term of this patent is extended or adjusted under 35 U.S.C. 154(b) by 386 days.

(21) Appl. No.: 14/310,547

(22) Filed: Jun. 20, 2014

(65) Prior Publication Data
US 2014/0375162 A1 Dec. 25, 2014

(30) Foreign Application Priority Data
Jun. 20, 2013 (KR) .......... 10-2013-0071161

(51) Int. Cl.
*H02K 1/27* (2006.01)
(52) U.S. Cl.
CPC .......... *H02K 1/2766* (2013.01); *H02K 1/276* (2013.01); *H02K 1/278* (2013.01); *H02K 1/2773* (2013.01)

(58) Field of Classification Search
CPC ....... H02K 1/2773; H02K 1/276; H02K 1/278
See application file for complete search history.

(56) References Cited

U.S. PATENT DOCUMENTS

| 7,466,054 B2 * | 12/2008 | Watson ............... H02K 1/2773 310/156.08 |
| 7,661,185 B2 | 2/2010 | Tapper |
| 2014/0103772 A1 * | 4/2014 | Kingrey ................ H02K 15/03 310/156.15 |

FOREIGN PATENT DOCUMENTS

| DE | 102004035446 A1 | 3/2006 | |
| JP | 2002-101583 A | 4/2002 | |
| JP | 2004-153977 A | 5/2004 | |
| JP | 2004-297969 A | 10/2004 | |
| JP | 2008-17646 A | 1/2008 | |
| JP | 2010-506560 A | 2/2010 | |
| JP | 2011067048 A1 * | 3/2011 | ............. H02K 19/12 |
| KR | 10-2006-0018704 A | 3/2006 | |

(Continued)

*Primary Examiner* — Dang Le
(74) *Attorney, Agent, or Firm* — Sughrue Mion, PLLC

(57) ABSTRACT

Exemplary embodiments disclose a rotor of an electric motor and an electric motor using the same. The rotor includes a core which includes a plurality of protrusion portions which are arranged along an outer circumference of the core and protrude radially to an outer portion of the core, and a plurality of concave portions interposed between the protrusion portions; a plurality of permanent magnets which are respectively disposed at the plurality of concave portions; and a plurality of pole pieces which are disposed at the plurality of concave portions and at outer sides of the plurality of permanent magnets. A length of each of the plurality of pole pieces in an axial direction is shorter than a length of each of the plurality of protrusion portions in the axial direction.

17 Claims, 8 Drawing Sheets

(56) References Cited

FOREIGN PATENT DOCUMENTS

| KR | 10-2006-0025390 A | 3/2006 |
|---|---|---|
| KR | 10-0624730 B1 | 9/2006 |

* cited by examiner

ROTOR OF ELECTRIC MOTOR AND MOTOR USING THE SAME

CROSS-REFERENCE TO RELATED PATENT APPLICATION

This application claims priority from Korean Patent Application No. 10-2013-0071161, filed on Jun. 20, 2013, in the Korean Intellectual Property Office, the disclosure of which is incorporated herein in its entirety by reference.

BACKGROUND

1. Field

Exemplary embodiments relate to a rotor that rotates with respect to a stator according to an electromagnetic interaction with the stator, and an electric motor using the same.

2. Description of the Related Art

Electric motors are apparatuses that convert electrical energy into mechanical energy with power applied to a conductor in a magnetic field. When power is applied to the conductor, current flows through the conductor. Various types of electric motors are applied throughout the industry. An output of each of the electric motors is proportional to an intensity of a magnetic field, an intensity of a current, and a length of a conductive wire. These three proportional components can be combined to obtain a high output.

An increase in the intensity of the magnetic field and the length of the conductive wire can increase the size of the electric motor. Electric motors, such as an in-wheel type driving motor for electric vehicles, a driving motor for hybrid vehicles, and a driving motor for washing machines, need to be small in size and have a high output.

SUMMARY

Exemplary embodiments provide a rotor of an electric motor which enables a high output and an electric motor using the same.

According to an aspect of an embodiment, there is provided a rotor of an electric motor including: a core which includes a plurality of protrusion portions which are arranged along an outer circumference of the core and protrude radially to an outer portion of the core, and a plurality of concave portions interposed between the protrusion portions; a plurality of permanent magnets which are respectively disposed at the plurality of concave portions; and a plurality of pole pieces which are disposed at the plurality of concave portions and at outer sides of the plurality of permanent magnets, wherein a length of each of the plurality of pole pieces in an axial direction is shorter than a length of each of the plurality of protrusion portions in the axial direction.

The protrusion portions may protrude further than the pole pieces in the axial direction.

A length of each of the permanent magnets may be longer than the pole pieces in the axial direction.

The length of each of the permanent magnets may be equal to or shorter than the length of each of the protrusion portions in the axial direction.

The rotor may further include a reinforcing member which includes a plurality of reinforcing parts respectively corresponding to the plurality of protrusion portions, wherein the reinforcing member is formed of a ferromagnetic material, and is disposed on at least one side of the core in the axial direction such that the plurality of reinforcing parts respectively contact the plurality of protrusion portions. A width of each of the reinforcing parts may be equal to or greater than a width of each of the protrusion portions.

The rotor may further include a blocking member which includes is formed of a magnetically non-permeable material, and is disposed on at least one of an upper side and lower side of each of the pole pieces of the respective concave portions, wherein the blocking member is configured to prevent a leakage magnetic flux between adjacent pole pieces among the plurality of pole pieces. The rotor may further include an upper plate and a lower plate which are respectively disposed at an upper side of the core and a lower side of the core in the axial direction, and are coupled to the core, wherein the blocking member is integrally formed with at least one of the upper plate and the lower plate.

The core and the pole pieces may be provided as one body.

According to another aspect of an embodiment, there is provided a rotor of an electric motor including: a core which includes a plurality of protrusion portions which are arranged to be spaced apart from each other along an outer circumference of the core and which protrude radially to an outer portion of the core; a plurality of permanent magnets which are respectively disposed between each of the plurality of protrusion portions; and a reinforcing member which is disposed on at least one side of the core in an axial direction, and is configured to enlarge a magnetic path passing through a corresponding protrusion portion in at least the axial direction.

The reinforcing member may include a plurality of reinforcing parts respectively corresponding to the plurality of protrusion portions, and is disposed on at least one side of the core in the axial direction such that the plurality of reinforcing parts respectively contact the plurality of protrusion portions.

The rotor may further include a plurality of pole pieces which are disposed between each of the plurality of protrusion portions and at outer sides of the plurality of permanent magnets, wherein a length of each of the pole pieces is shorter than a length of each of the protrusion portions in the axial direction, and wherein a length of each of the permanent magnets in the axial direction is longer than the length of each of the pole pieces in the axial direction.

The rotor may further include a blocking member which is formed of a magnetically non-permeable material, and is disposed on at least one of an upper side and lower side of each of the pole pieces, wherein the blocking member is configured to prevent a leakage magnetic flux between adjacent pole pieces.

According to another aspect of an embodiment, there is provided an electric motor including: a stator which includes a coil generating an electric field; and a rotor configured to rotate according to an electromagnetic interaction with the coil. The rotor includes a core which includes a plurality of protrusion portions which are arranged along an outer circumference of the core and protrude radially to an outer portion of the core, and a plurality of concave portions interposed between the respective protrusion portions; a plurality of permanent magnets which are disposed at the plurality of concave portions, respectively; and a plurality of pole pieces which are disposed at the plurality of concave portions and at outer sides of the plurality of permanent magnets, wherein a length of each of the plurality of pole pieces is shorter than a length of each of the plurality of protrusion portions in an axial direction.

BRIEF DESCRIPTION OF THE DRAWINGS

The above and other aspects will become more apparent by describing in detail exemplary embodiments thereof with reference to the attached drawings in which.

DETAILED DESCRIPTION

Figure 1:
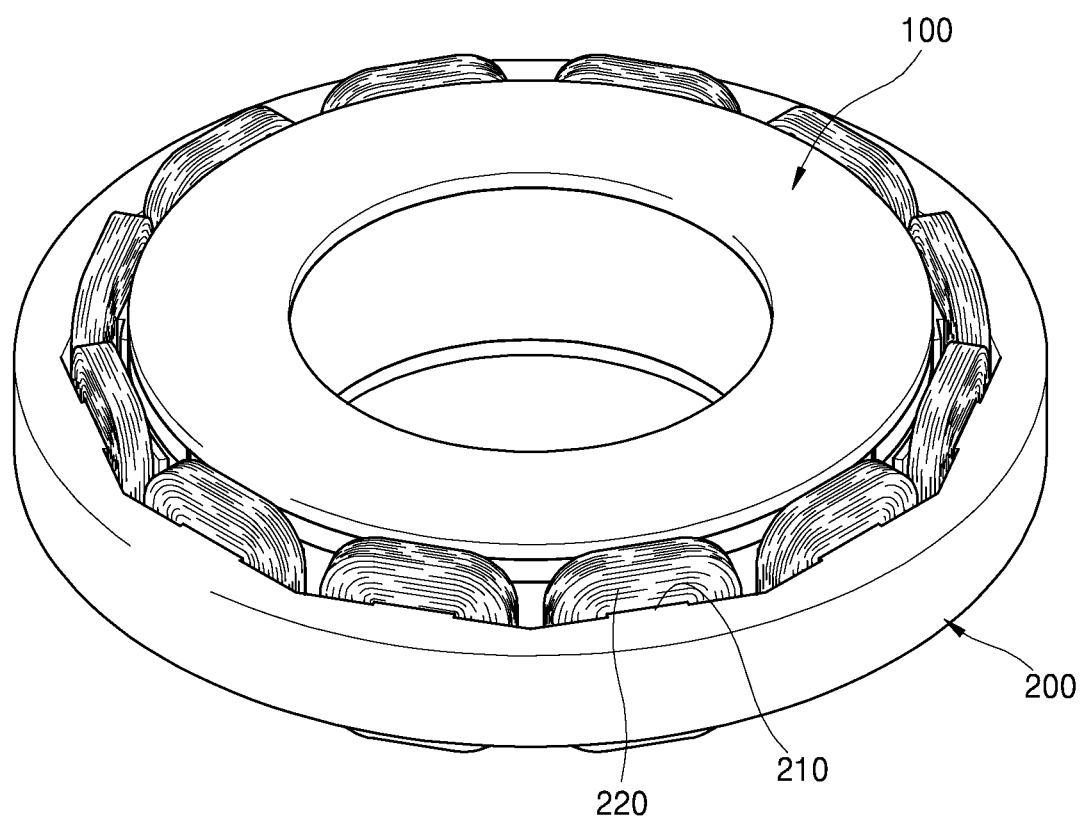
FIG. 1 is a perspective view illustrating an embodiment of an electric motor.

Hereinafter, exemplary embodiments of a rotor of an electric motor and an electric motor using the same will be described in detail with reference to the accompanying drawings. Sizes of members illustrated in the accompanying drawings and an interval between the members may be exaggerated for clarity of the specification. Like reference numerals refer to like elements throughout.

FIG. 1 is a perspective view illustrating an embodiment of an electric motor. Referring to FIG. 1, the electric motor includes a stator 200 and a rotor 100 that rotates with respect to the stator 200. The stator 200 has a hollow shell shape, and includes a plurality of teeth 210 that protrude radially toward an inner portion of the stator 200. A winding wire 220 is wound around the plurality of teeth 210.

Figure 2:
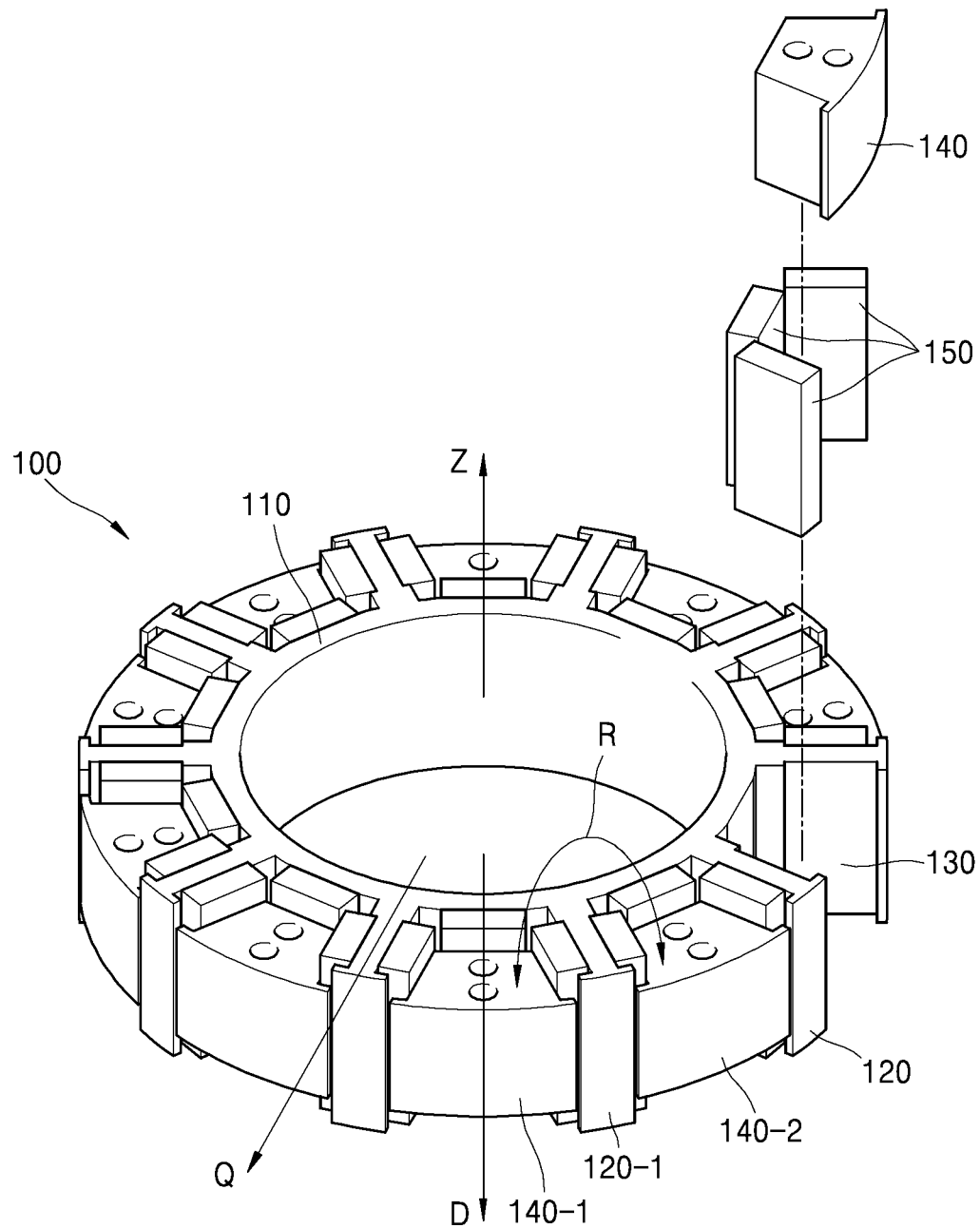
FIG. 2 is a partially exploded perspective view illustrating an embodiment of a rotor of FIG. 1.

The rotor 100 is disposed at an inner side of the rotor 200. FIG. 2 is a partially exploded perspective view illustrating an embodiment of the rotor 100 of FIG. 1. In the perspective view of the rotor 100 of FIG. 2, a structure for fixing a pole piece 140 to a core 110 is not illustrated. Referring to FIG. 2, the rotor 100 includes the core 110 and a permanent magnet 150. The core 110 includes a plurality of protrusion portions 120, that are arranged spaced apart from each other at certain intervals along an outer circumference of the core 110 and protrude radially toward an outer portion, and a plurality of concave portions 130 between the protrusion portions. The core 110 may have a structure in which a plurality of thin plates formed of a ferromagnetic material (or a magnetically permeable material), e.g., a plurality of steel plates, are stacked in an axial direction Z. The protrusion portions 120 respectively face the teeth 210 of the rotor 200, and the number of protrusion portions 120 may be a same number as a number of teeth 210. The permanent magnet 150 is disposed at each of the plurality of concave portions 130. In the embodiment, the permanent magnet 150 is disposed at each side of the three sides of the concave portion 130. The three sides have an approximate U-shape. However, the number and disposition type of the permanent magnets 150 disposed at each concave portion 130 are not limited to the embodiment of the FIG. 2. The pole piece 140 is also disposed at each of the concave portions 130. The pole piece 140 is disposed between the permanent magnet 150 and the rotor 200. The pole piece 140 is formed of a ferromagnetic material (or a magnetically permeable material). The pole piece 140 may have a structure in which a plurality of thin plates formed of a ferromagnetic material (or a magnetically permeable material), e.g., a plurality of steel plates, are stacked in an axial direction Z. The protrusion portion 120 forms a magnetic path in a Q-axis direction, and the pole piece 140 forms a magnetic path in a D-axis direction.

A structural improvement of the rotor 100 may increase an output of an electric motor. Increasing the output of the electric motor may occur when a length of the rotor 100 in the axial direction Z is formed longer overall than the stator 200. The length of the rotor 100 in the axial direction Z may be formed longer overall than the stator 200 by applying an overhang structure to the whole rotor 100. The whole overhang structure may be a scenario in which a length L1 of the pole piece 140 is a same length as a length L2 of the protrusion portion 120 in FIG. 3. In this way, an end turn of the winding wire 220 of the rotor 200 can be effectively used, and a leakage magnetic flux of the permanent magnet 150 in the axial direction Z can be used. However, when the whole overhang structure is applied to the rotor 100, i.e., when the overhang structure is applied to both the protrusion portion 120 and the pole piece 140, a D-axis inductance Ld and a Q-axis inductance Lq increase simultaneously. Thus, a counter-electromotive force increases. The increase in the counter-electromotive force limits a driving voltage of the electric motor. Thus, the counter-electromotive force can become a factor that decreases an output of the electric motor. Further, in this scenario, a leakage magnetic flux caused by two pole pieces 140 separated from each other by the protrusion portion 120 increases, and a torque increase effect of the overhang structure is reduced.

Figure 3:
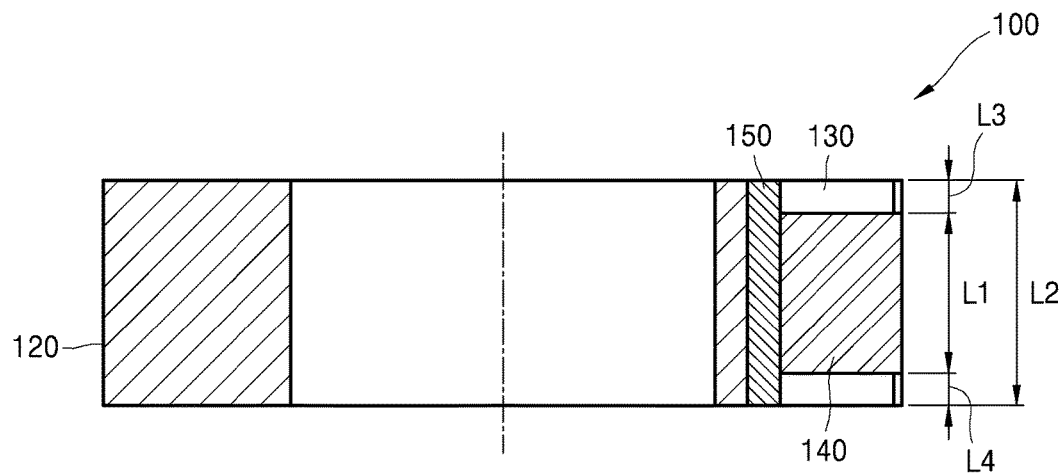
FIG. 3 is a cross-sectional view of FIG. 2.

FIG. 3 is a cross-sectional view of FIG. 2. Referring to FIGS. 2 and 3, the length L1 of the pole piece 140 in the axial direction Z is shorter than the length L2 of the protrusion portion 120. The protrusion portion 120 further protrudes to at least one side of the pole piece 140 in the axial direction Z. In the embodiment of the FIGS. 2 and 3, the protrusion portion 120 further protrudes to both sides of the pole piece 140 in the axial direction Z. The protruding lengths L3 and L4 correspond to the overhang structure. A length of the permanent magnet 150 in the axial direction Z is longer than the length L1 of the pole piece 140. Therefore, the permanent magnet 150 extends to above the length L1 of the pole piece 140 in the axial direction Z. The length of the permanent magnet 150 in the axial direction Z may be longer than the length L2 of the protrusion portion 120. However, by making efficient use of a magnetic flux based on the permanent magnet 150, the length of the permanent magnet 150 in the axial direction Z may also be shorter than the length L2 of the protrusion portion 120.

An output torque T and a counter-electromotive force V0 based on the electric motor may be expressed as the following Equations (1) and (2), respectively.

$$T = P_n \Psi_a I_a \cos\beta + P_n (L_q - L_d) I_a^2 \sin 2\beta \qquad (1)$$

$$V_0 = \omega \sqrt{(L_d i_d + \Psi_a)^2 + (L_q i_q)^2} \qquad (2)$$

where $P_n$ denote a pole constant, $\Psi_a$ denotes a magnetic flux based on the permanent magnet, $I_a$ denotes a current, $\beta$ denotes a current phase angle, $L_q$ denotes the Q-axis inductance, $L_d$ denotes the D-axis inductance, $i_d$ denotes a current applied to the Q axis, and $i_q$ denotes a current applied to the D axis.

In Equation (1), a first item of a right side denotes an electromagnetic torque component, and a second item of the right side denotes a reluctance torque component. The end turn of the winding wire 220 of the stator 200 and the leakage magnetic flux of the permanent magnet 150 in the axial direction Z can be effectively used by the protrusion portion 120 having the overhang structure. In other words, compared to a case in which the overhang structure is not applied, a cross-sectional area of the protrusion portion 120 in the axial direction Z increases. Thus, a magnetic reluctance decreases, and the Q-axis inductance $L_q$ increases to be the same as that of the overall overhang structure. However, the length L1 of the pole piece 140 is short compared to the overall overhang structure. Thus, the magnetic reluctance is relatively high. Therefore, the D-axis inductance $L_d$ is reduced. Referring to Equation (1), the increase in the Q-axis inductance $L_q$ causes an increase in torque. Also, the decrease in the D-axis inductance $L_d$ causes the increase in torque. Accordingly, an overall torque can increase. In this scenario, a torque increases compared to the overall overhang structure.

Equation (2) will now be described. As the counter-electromotive force $V_0$ becomes lower, a driving voltage of the electric motor is less limited by the counter-electromotive force $V_0$. Thus, a torque can increase, and an efficient driving can be performed. According to the embodiment, in comparison with a case using the overall overhang structure, the Q-axis inductance $L_q$ increases, but the D-axis inductance $L_d$ decreases. Accordingly, an increased amount of the counter-electromotive force $V_0$ can be reduced compared to the overall overhang structure.

Moreover, a leakage magnetic flux can be generated between adjacent pole pieces 140-1 and 140-2 divided by a protrusion portion 120-1, through a path indicated by reference numeral R in FIG. 2. According to the embodiment, the length L1 of each of the pole pieces 140-1 and 140-2 is shorter than the length L2 of the protrusion portion 120-1. Thus, a length of the leakage magnetic flux path R is long compared to the overall overhang structure in which L1 is equal to L2. Accordingly, a magnetic reluctance of the leakage magnetic flux path R increases. Thus, in the embodiment, an amount of leakage magnetic flux can be reduced, and an efficiency of a magnetic torque can be enhanced.

The following Table 1 shows outputs that are obtained by applying the rotor 100 (exemplary embodiment), a rotor (comparative example 1) having the overall overhang structure, and a rotor (comparative example 2) with no overhang structure to an in-wheel motor of 20 kW class, respectively. Referring to Table 1, it can be seen that a case using the rotor 100 according to the embodiment can obtain an output (kW) enhanced by about 4.5% compared to a case using the overall overhang structure.

TABLE 1

| Items | Example | Comparative example 1 | Comparative example 2 |
|---|---|---|---|
| An overhang amount of pole piece (mm) | 2 | 5 | 0 |
| An overhang amount of permanent magnet (mm) | 5 | 5 | 0 |
| An overhang amount of protrusion portion (mm) | 5 | 5 | 0 |
| Basic speed (rpm) | 3001 | 2893 | 3100 |
| Torque (Nm) | 76.52 | 75.8 | 68.2 |
| Output (kW) | 24.05 | 22.97 | 22.14 |
| Output ratio (%) | 100 | 95.5 | 92.1 |

Figure 4:
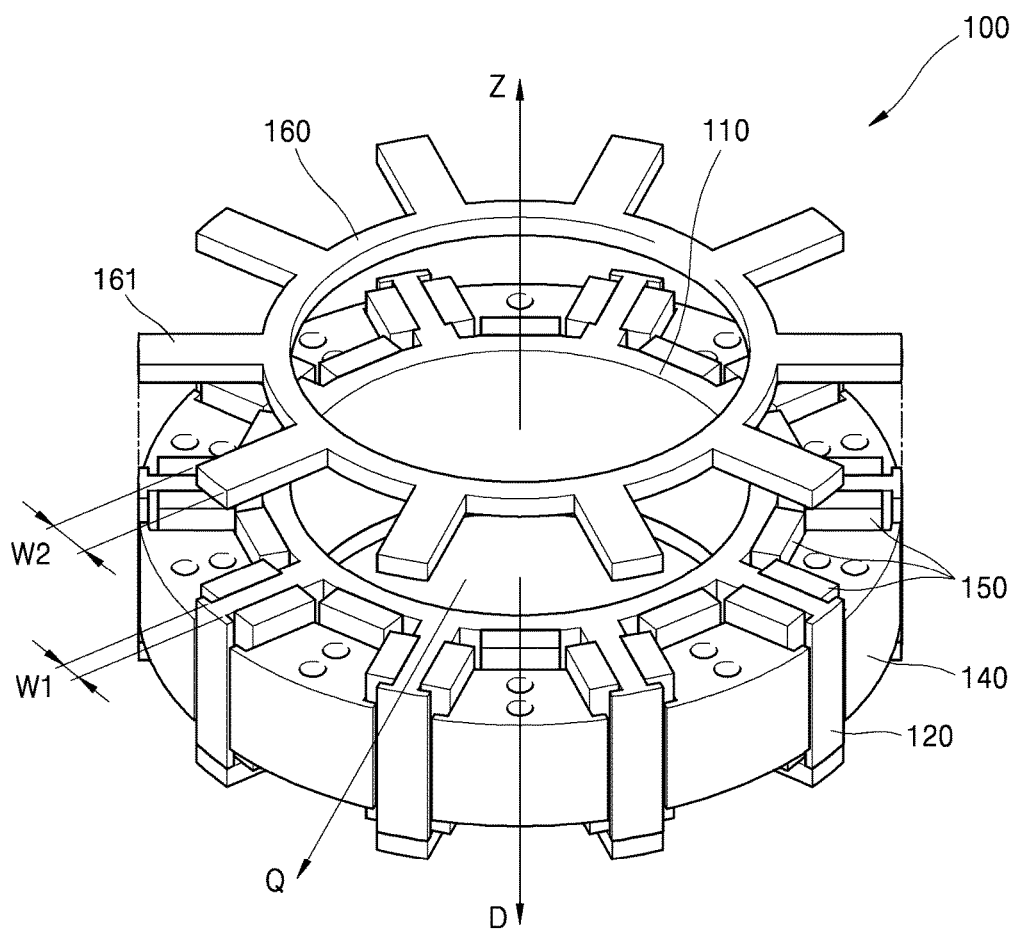
FIG. 4 is a perspective view illustrating an embodiment of a rotor using a reinforcing member.

FIG. 4 is a perspective view illustrating an embodiment of the rotor 100 using a reinforcing member. Referring to FIG. 4, a large permanent magnet 150 may be used for providing a strong magnetic force based on the permanent magnet 150. Therefore, a size of the concave portion 130, that is a space with the permanent magnet 150 installed therein, may be enlarged. A width (W1 in FIG. 4) of the protrusion portion 120 is relatively reduced, and the reduction in width of the protrusion portion 120 may be a factor that increases a magnetic reluctance of a magnetic path in the Q-axis direction. A reinforcing member 160 may be used for compensating the increase (caused by the reduction in the width W1 of the protrusion portion 120) in the magnetic reluctance in the Q-axis direction. The reinforcing member 160 increases a cross-sectional area (a cross-sectional area in a direction vertical to the Q axis) of the magnetic path in the Q-axis direction, and thus decreases the magnetic reluctance. In other words, the reinforcing member 160 enlarges a cross-sectional area of the magnetic path (provided by the protrusion portion 120) in the Q-axis direction to at least the axial direction Z. The reinforcing member 160 includes a plurality of reinforcing parts 161 that extend radially in correspondence with a plurality of the protrusion portions 120. The width W2 of the reinforcing part 161 may be greater than the width W1 of the protrusion portion 120. The reinforcing member 160 is disposed on and/or under the core 110 in the axial direction Z. The reinforcing member 160 is disposed in order for the plurality of reinforcing parts 161 to respectively contact the plurality of protrusion portions 120. Accordingly, the magnetic reluctance of the magnetic path in the Q-axis direction can be reduced.

Figure 5:
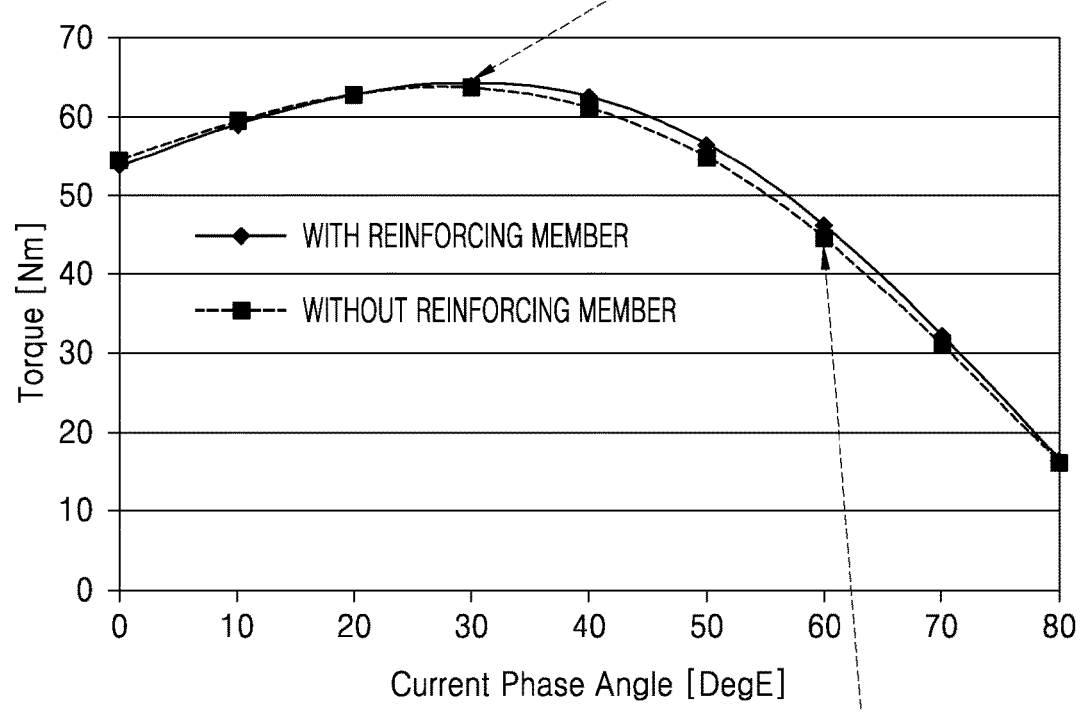
FIG. 5 is a graph showing a torque change with respect to a current phase angle before and after applying the reinforcing member.

FIG. 5 is a graph showing a torque change with respect to a current phase angle in a case in which the reinforcing member 160 is applied, and a case in which the reinforcing member 160 is not applied. The width W1 of the protrusion portion 120 is 1.5 mm, and the width W2 of the reinforcing part 161 of the reinforcing member 160 is 4 mm. Referring to FIG. 5, a torque performance can be enhanced by about 0.89% in the maximum torque section (a current phase angle of 30 degrees), and a torque performance can be enhanced by about 3.5% in a high speed section (a current phase angle of 60 degrees).

Figure 6:
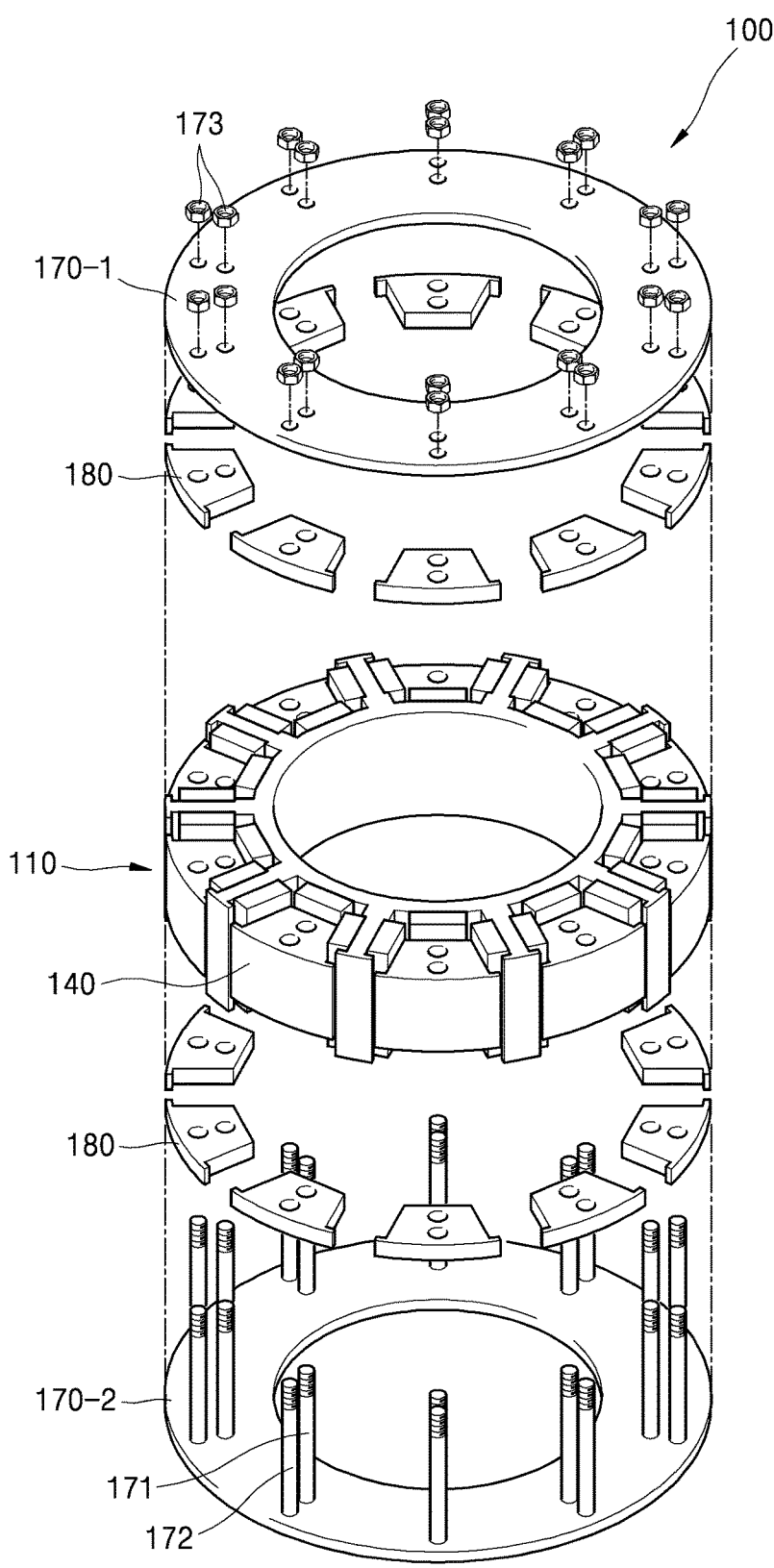
FIG. 6 is an exploded perspective view illustrating an embodiment of an assembly method of the rotor of FIG. 2.

FIG. 6 is an exploded perspective view illustrating an embodiment of an assembly type of the rotor 100 of FIG. 2. Referring to FIG. 6, an upper plate 170-1 and a lower plate 170-2 are respectively disposed at both sides of the core 110 in the axial direction Z. A plurality of pins 171 and 172 protrude to the upper plate 170-1 through the pole piece 140 and the upper plate 170-1. The pins 171 and 172 protrude to the upper plate 170-1 from the lower plate 170-2. A screw thread may be formed at an upper end portion of each of the pins 171 and 172. For example, an assembly of the rotor 100 may be finished by coupling a nut 173 to each of the pins 171 and 172.

The length L1 of the pole piece 140 is shorter than the length L2 of the protrusion 120. Thus, a space is formed at an upper portion and lower portion of the pole piece 140 in the concave portion 130. A blocking member 180 for blocking a leakage magnetic flux may be disposed in the space. For example, in FIGS. 4 and 6, the blocking member 180 having a plate shape may be disposed between the pole piece 140 and the upper plate 170-1 and between the pole piece 140 and the lower plate 170-2. The blocking member 180 may be formed of a magnetically non-permeable material, e.g., stainless steel, polymer plastic, etc. The blocking member 180 blocks a leakage magnetic flux in the axial direction Z of FIG. 2, i.e., prevents the magnetic flux of the permanent magnet 150 from being leaked through the leakage magnetic flux path R of FIG. 2.

Figure 7:
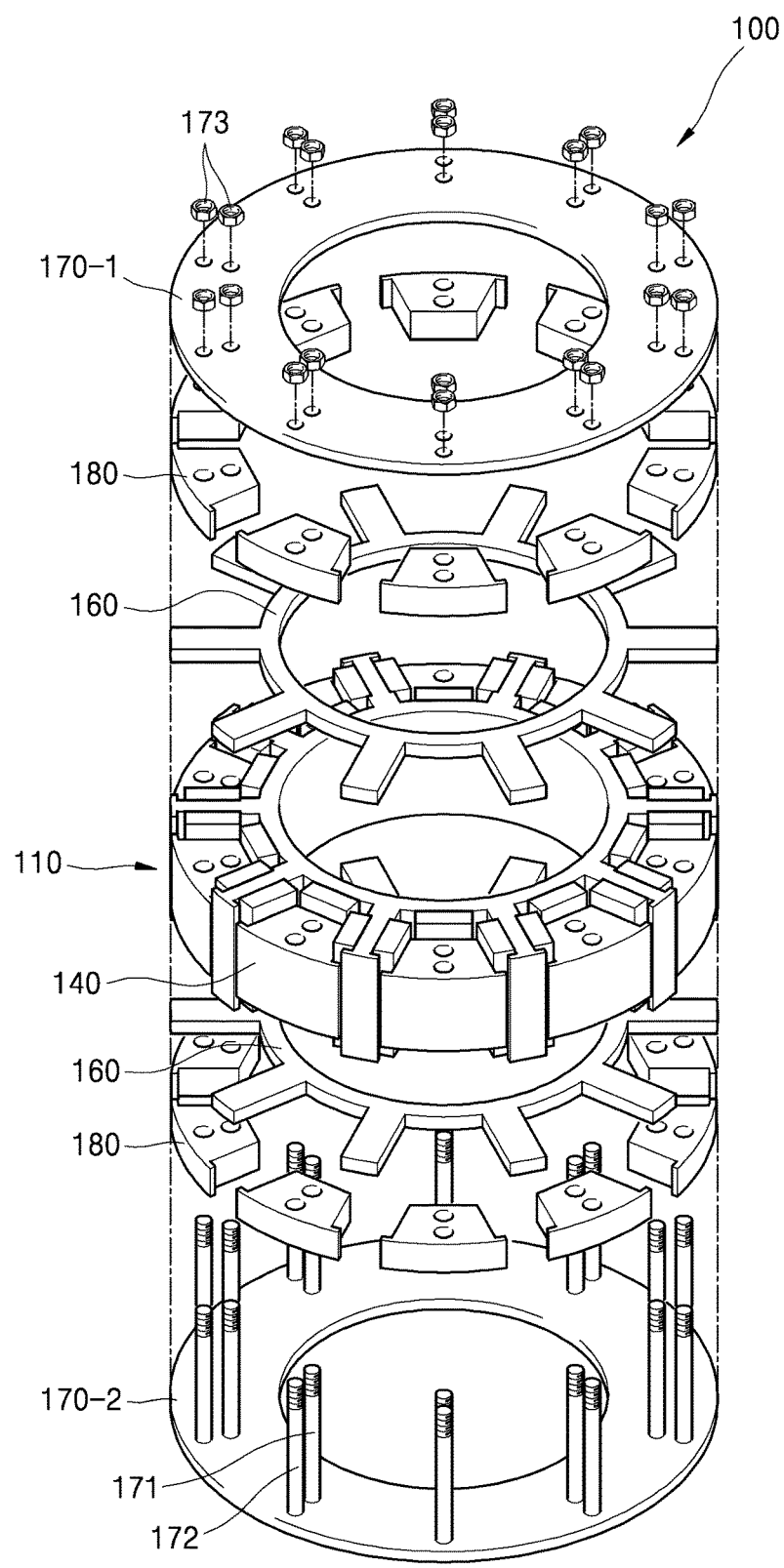
FIG. 7 is an exploded perspective view illustrating an embodiment of an assembly method of the rotor of FIG. 4.

FIG. 7 is an exploded perspective view illustrating an embodiment of an assembly type of the rotor 100 of FIG. 4. Referring to FIG. 7, the upper plate 170-1 and the lower plate 170-2 are respectively disposed at both sides of the core 110 in the axial direction Z, and the reinforcing member 160 is disposed between the upper plate 170-1 and the core 110 and/or between the lower plate 170-2 and the core 110. A blocking member 180 for blocking a leakage magnetic flux may be disposed in the space which is formed at the upper portion and lower portion of the pole piece 140 in the concave portions 130. An assembly of the rotor 100 may be finished by coupling, e.g., the nut 173 to an upper end portion of each of the pins 171 and 172 which protrude through to the upper plate 170-1 through the pole piece 140 and the upper plate 170-1 from the lower plate 170-1.

Figure 8:
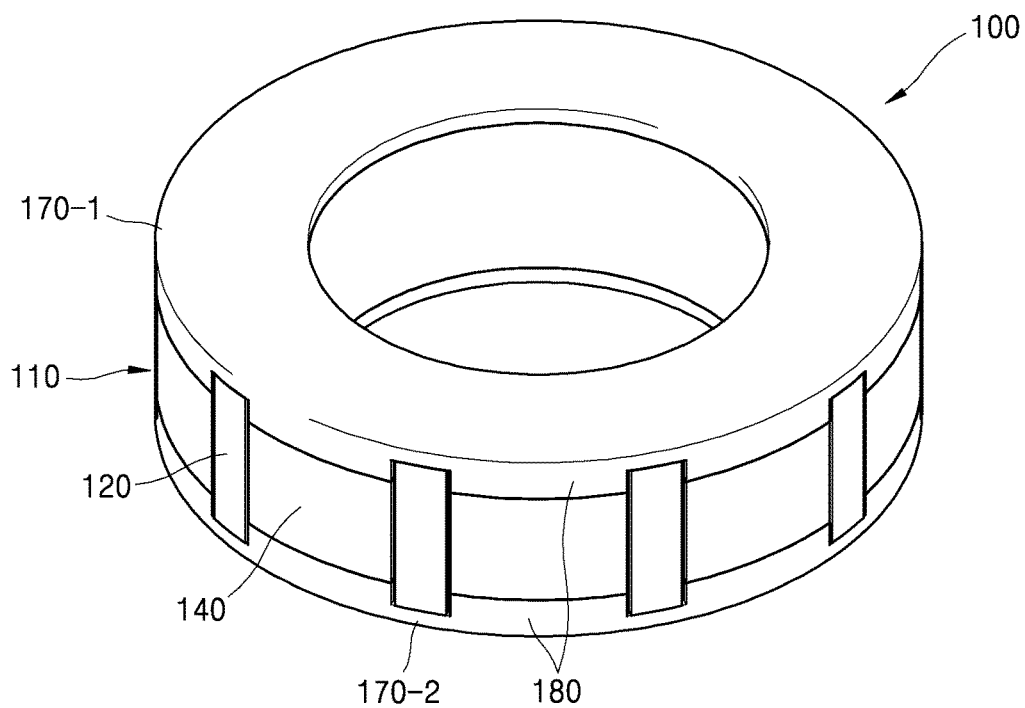
FIG. 8 is a partially exploded perspective view illustrating an embodiment of the assembly method of the rotor of FIG. 2.
Figure 9:
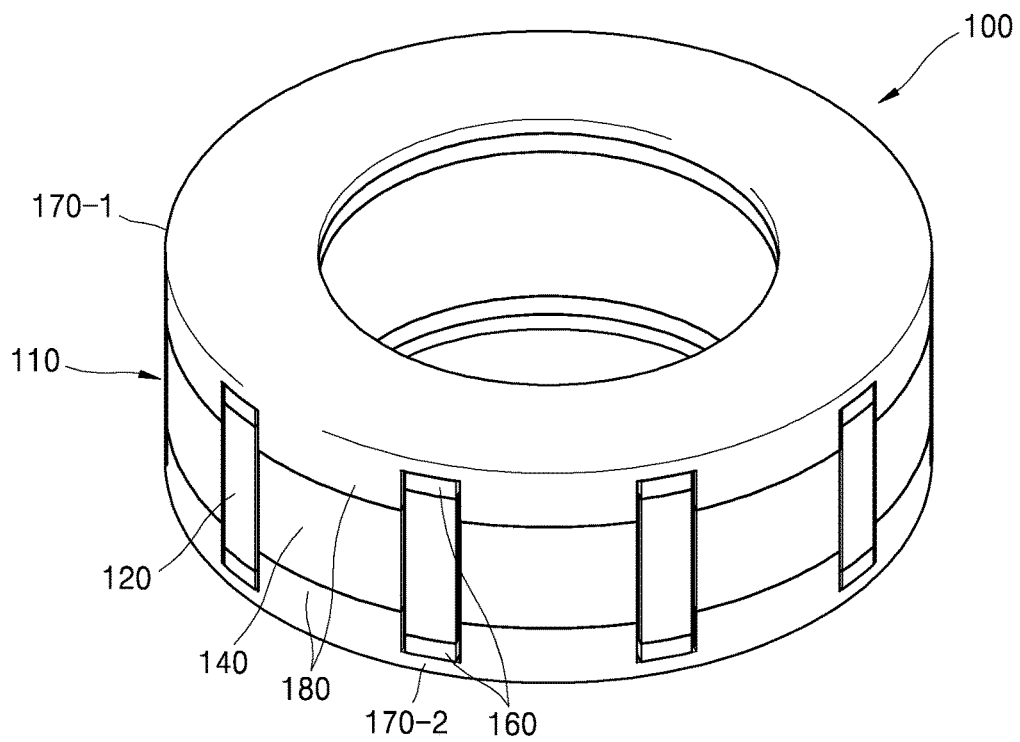
FIG. 9 is a partially exploded perspective view illustrating an embodiment of the assembly method of the rotor of FIG. 4.

In the above-described embodiment, a case in which the upper and lower plates 170-1 and 170-2 and the blocking member 180 are separately provided has been described, but the spirit and scope of the exemplary embodiments are not limited thereto. The blocking member 180 may be integrally formed with at least one of the upper plate 170-1 and the lower plate 170-2. For example, by an injection molding method, the upper plate 170-1 and the blocking member 180 under the upper plate 170-1 may be injection-molded as one body, and the lower plate 170-2 and the blocking member 180 on the lower plate 170-2 may be injection-molded as one body, thereby realizing an assembly of the rotor 100. Referring to FIG. 8, the core 110 and the pole piece 140 may be inserted into a mold having a cavity corresponding to the upper plate 170-1 and the blocking member 180, the upper plate 170-1 and the blocking member 180 may be primarily injection-molded as one body at an upper side of the core 110 by a plastic injection molding method, the primarily molded material may be inserted into another mold having a cavity corresponding to the lower plate 170-2 and the blocking member 180, and the lower plate 170-2 and the blocking member 180 may be secondarily injection-molded as one body at a lower side of the core 110 by the plastic injection molding method, thereby forming the rotor 100 having the above-described type. Also, as illustrated in FIG. 9, the core 110, the pole piece 140, and the reinforcing member 160 may be inserted into a mold, the upper plate 170-1 and the blocking member 180 may be primarily injection-molded as one body at the upper side of the core 110 by the plastic injection molding method, the primarily molded material and the reinforcing member 160 may be inserted into another mold, and the lower plate 170-2 and the blocking member 180 may be secondarily injection-molded as one body at the lower side of the core 110 by the plastic injection molding method, thereby forming the rotor 100 using the reinforcing member 160 of FIG. 4.

However, the spirit and scope of the exemplary embodiments are not limited thereto. In a state in which the core 110 and the pole piece 140 are disposed between the upper plate 170-1 and blocking member 180 provided as one body and the lower plate 170-2 and blocking member 180 provided as one body, as described above with reference to FIGS. 6 and 7, the pins 171 and 172 passing through the above-mentioned elements may be provided, and the nut 173 may be coupled to the pins 171 and 172.

Figure 10:
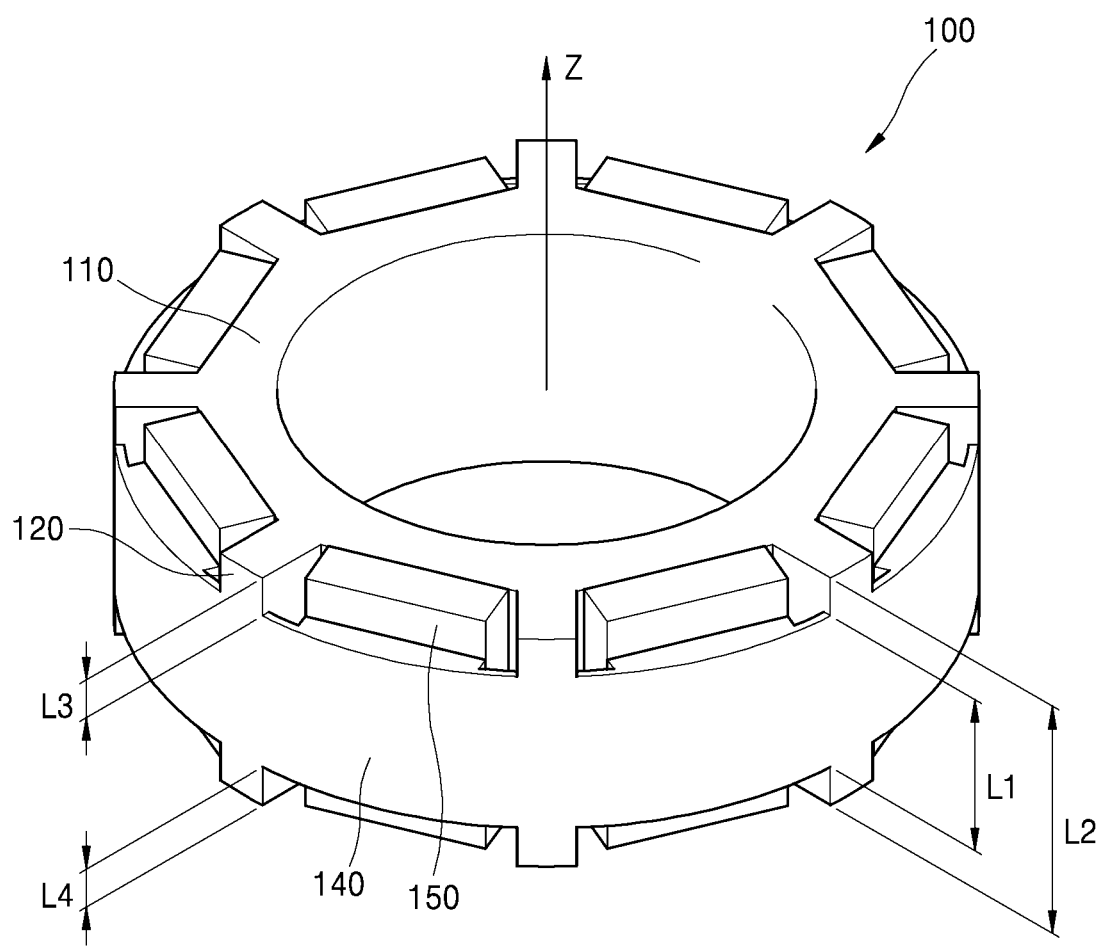
FIG. 10 is a perspective view illustrating an embodiment of a rotor in which a core is integrated with a pole piece.

An embodiment of the rotor 100 having the core 110 and pole piece 140 in which the thin plates formed of a ferromagnetic material (or a magnetically permeable material) are stacked has been described, but the embodiment of the rotor 100 is not limited thereto. For example, as illustrated in FIG. 10, the rotor 100 in which the core 110, the protrusion portion 120, and the pole piece 140 are provided as one body may be implemented. In this case, the rotor 100 may be molded by a powder metallurgy method using a ferromagnetic material (or a magnetically permeable material). The permanent magnet 150 is disposed in an accommodating space between the core 110 and the pole piece 140.

Although not shown, the reinforcing member 160 of FIG. 4 and the blocking member 180 of FIG. 6 may also be applied to the rotor 100 of FIG. 10. Also, the assembly method using the injection molding of FIGS. 8 and 9 may be applied as the assembly method of the rotor 100 of FIG. 10.

While the exemplary embodiments have been particularly shown and described, it will be understood by those of ordinary skill in the art that various changes in form and details may be made therein without departing from the spirit and scope of the exemplary embodiments as defined by the following claims.

What is claimed is:

1. A rotor of an electric motor, the rotor comprising:
a core comprising a plurality of protrusion portions which are arranged along an outer circumference of the core and protrude radially to an outer portion of the core, and a plurality of concave portions interposed between the protrusion portions;
a plurality of permanent magnets which are respectively disposed at the plurality of concave portions; and
a plurality of pole pieces which are disposed at the plurality of concave portions and at outer sides of the plurality of permanent magnets,
wherein a length of each of the plurality of pole pieces in an axial direction is shorter than a length of each of the plurality of protrusion portions in the axial direction,
wherein a length of each of the plurality of permanent magnets is longer than a length of each of the plurality of pole pieces in the axial direction, and
wherein the length of each of the plurality of permanent magnets is equal to or shorter than the length of each of the plurality of protrusion portions in the axial direction.

2. The rotor of claim 1, wherein each of the plurality of protrusion portions protrude further than each of the plurality of pole pieces in the axial direction.

3. The rotor of claim 1, further comprising a reinforcing member comprising a plurality of reinforcing parts respectively corresponding to the plurality of protrusion portions,
wherein the reinforcing member is formed of a ferromagnetic material, and is disposed on at least one side of the core in the axial direction such that the plurality of reinforcing parts respectively contact the plurality of protrusion portions.

4. The rotor of claim 3, wherein a width of each of the plurality of reinforcing parts is equal to or greater than a width of each of the plurality of protrusion portions.

5. The rotor of claim 1, further comprising a blocking member which is formed of a magnetically non-permeable material, and is disposed on at least one of an upper side and a lower side of each of the plurality of pole pieces in the plurality of concave portions,
wherein the blocking member is configured to prevent a leakage magnetic flux between adjacent pole pieces among the plurality of pole pieces.

6. The rotor of claim 5, further comprising an upper plate and a lower plate which are respectively disposed at an upper side of the core and a lower side of the core in the axial direction, and are coupled to the core,
wherein the blocking member is integrally formed with at least one of the upper plate and the lower plate.

7. The rotor of claim 1, wherein the core and the plurality of pole pieces are provided as one body.

8. A rotor of an electric motor, the rotor comprising:
a core comprising a plurality of protrusion portions which are arranged spaced apart from each other along an outer circumference of the core and protrude radially to an outer portion of the core;
a plurality of permanent magnets which are respectively disposed between each of the plurality of protrusion portions; and
a reinforcing member which is disposed on at least one side of the core in an axial direction, and is configured to enlarge a magnetic path passing through a corresponding protrusion portion in at least the axial direction,
wherein a circumferential width of the reinforcing member is greater than a circumferential width of the corresponding protrusion portion.

9. The rotor of claim 8, wherein the reinforcing member comprises a plurality of reinforcing parts respectively corresponding to the plurality of protrusion portions, and is disposed on at least one side of the core in the axial direction such that the plurality of reinforcing parts respectively contact the plurality of protrusion portions.

10. The rotor of claim 8, further comprising a plurality of pole pieces which are disposed between each of the plurality of protrusion portions and at outer sides of each of the plurality of permanent magnets,
wherein a length of each of the plurality of pole pieces is shorter than a length of each of the plurality of protrusion portions in the axial direction, and
wherein a length of each of the plurality of permanent magnets is longer than the length of each of the plurality of pole pieces in the axial direction.

11. The rotor of claim 10, further comprising a blocking member which is formed of a magnetically non-permeable material, and is disposed on at least one of an upper side and lower side of each of the plurality of pole pieces,
wherein the blocking member is configured to prevent a leakage magnetic flux between adjacent pole pieces.

12. An electric motor comprising:
a stator comprising a coil generating an electric field; and
a rotor configured to rotate according to an electromagnetic interaction with the coil, the rotor comprising:
a core comprising a plurality of protrusion portions which are arranged along an outer circumference of the core and protrude radially to an outer portion of the core, and a plurality of concave portions interposed between the respective protrusion portions;
a plurality of permanent magnets which are disposed at the plurality of concave portions, respectively; and
a plurality of pole pieces which are disposed at the plurality of concave portions and at outer sides of the plurality of permanent magnets,
wherein a length of each of the plurality of pole pieces in an axial direction is shorter than a length of each of the plurality of protrusion portions in the axial direction,
wherein a length of each of the plurality of permanent magnets is longer than each of the plurality of pole pieces in the axial direction, and
wherein the length of each of the plurality of permanent magnets is equal to or shorter than the length of each of the plurality of protrusion portions in the axial direction.

13. The electric motor of claim 12, wherein each of the plurality of protrusion portions protrude further than each of the plurality of pole pieces in the axial direction.

14. The electric motor of claim 12, further comprising a reinforcing member comprising a plurality of reinforcing parts respectively corresponding to the plurality of protrusion portions,
wherein the reinforcing member is formed of a ferromagnetic material, and is disposed on at least one side of the core in the axial direction such that the plurality of reinforcing parts respectively contact the plurality of protrusion portions.

15. The electric motor of claim 14, wherein a width of each of the plurality of reinforcing parts is equal to or greater than a width of each of the plurality of protrusion portions.

16. The electric motor of claim 12, further comprising a blocking member which is formed of a magnetically non-permeable material, and is disposed on at least one of an upper side and lower side of each of the plurality of pole pieces of the respective concave portions,
wherein the blocking member is configured to prevent a leakage magnetic flux between adjacent pole pieces.

17. The electric motor of claim 16, further comprising an upper plate and a lower plate which are respectively disposed at an upper side of the core and a lower side of the core in the axial direction,
wherein the upper plate and the lower plate are coupled to the core, and
wherein the blocking member is integrally formed with at least one of the upper plate and the lower plate.

* * * * *